United States Patent [19]
Bourret et al.

[11] Patent Number: 5,801,878
[45] Date of Patent: Sep. 1, 1998

[54] CIRCUIT HAVING TWO OPTICAL AMPLIFIERS, IN PARTICULAR FOR A REPEATER IN AN UNDERSEA TELECOMMUNICATIONS SYSTEM

[75] Inventors: Gérard Bourret, La Ville du Bois; Bernard Gherardi, Lisses, both of France

[73] Assignee: Alcatel Submarine Networks, Clichy, France

[21] Appl. No.: 840,761

[22] Filed: Apr. 16, 1997

[30] Foreign Application Priority Data

Apr. 18, 1996 [FR] France ................... 96 04869

[51] Int. Cl.$^6$ ................................................. H01S 3/00
[52] U.S. Cl. .......................... 359/341; 359/141; 359/160
[58] Field of Search ............................... 359/341, 141, 359/160

[56] References Cited

U.S. PATENT DOCUMENTS

| 5,343,320 | 8/1994 | Anderson | 359/160 |
| 5,506,723 | 4/1996 | Junginger | 359/341 |
| 5,652,675 | 7/1997 | Shibuya | 359/341 |

FOREIGN PATENT DOCUMENTS

| 0613221A2 | 8/1994 | European Pat. Off. . |
| 0641051A1 | 3/1995 | European Pat. Off. . |
| 0660468A1 | 6/1995 | European Pat. Off. . |
| 0695002A2 | 1/1996 | European Pat. Off. . |
| 2284926 | 6/1995 | United Kingdom . |

OTHER PUBLICATIONS

Patent Abstracts of Japan, vol. 016, No. 185 (E–1197), 6 May 1992 corresponding to JP–A–04 023528 (Fujitsu Ltd), 27 Jan. 1992.

*Primary Examiner*—Mark Hellner
*Attorney, Agent, or Firm*—Sughrue, Mion, Zinn, Macpeak & Seas, PLLC

[57] ABSTRACT

A circuit having two optical amplifiers each of which comprises a pump source, an active medium such as an optical fiber, and means for recovering pump energy that is unused in its active medium so that said energy can be reinjected into the other amplifier. The recovery means is such that in each amplifier, reinjection is performed in the direction opposite to the direction in which the main pump energy is injected. By way of example, each amplifier includes a recovery terminal constituting both an outlet for the unused pump energy and an inlet for reinjection the pump energy as recovered from the other amplifier. A single conductor provides an optical link between the recovery terminals of the two amplifiers. The circuit can be used in a repeater for long distance transmission of optical signals, in particular for undersea transmission.

12 Claims, 1 Drawing Sheet

CIRCUIT HAVING TWO OPTICAL AMPLIFIERS, IN PARTICULAR FOR A REPEATER IN AN UNDERSEA TELECOMMUNICATIONS SYSTEM

The invention relates to a circuit having two optical amplifiers, in particular for signal repeaters in a telecommunications system using optical conductors.

BACKGROUND OF THE INVENTION

Signal transmission by means of optical conductors is often used over long distances, in particular for transmitting telephone signals or digital data signals over transoceanic distances.

This type of transmission is relatively insensitive to noise and attenuates the signals relatively little.

However attenuation is not zero. That is why repeaters are provided from place to place along a transmission system for the purpose of amplifying the optical signals. In general, each repeater comprises a pair of optical amplifiers, one amplifying the signal in a "go" direction and the other in a "return" direction.

The fibers most commonly used for transmission purposes are silica fibers, e.g. germanium-doped fibers, for which the transmission coefficient is optimum at a wavelength of about 1550 nanometers (nm). In such transmission systems, optical amplifiers are provided comprising firstly, as an active medium, an erbium-doped fiber, and secondly a pump laser (or "pump") emitting at a wavelength of 1475 nm.

The pump serves to excite electrons in the fiber and it is the return of such electrons to the unexcited state under the effect of a light signal that produces the desired effect of optically amplifying said light signal.

The output level of an amplifier increases with increasing pump power. For optical transmission, it is advantageous to maximize pump power so as to reduce the number of repeaters on the line.

To increase the output level of a pair of optical amplifiers, proposals have already been made (in Japanese patent application 4-023528) to inject into one amplifier unused pump energy recovered from the other amplifier, said recovered energy being added to that of the pump associated with the amplifier benefitting from such injection. It commonly happens that about 20% of the pump energy is not used by the active medium, i.e. for exciting electrons. This unused light energy is transmitted by the fiber of the amplifier and is to be found in the output thereof. It is this unused energy recovered from the output of one amplifier that is used to increase the pump power delivered to the other amplifier.

Recovering energy thus increases the pump power in each amplifier by about 20%, thereby increasing the output level from each amplifier by about 20% to 25%.

In the known circuit, the energy recovered at the output of one amplifier is injected into the other amplifier in the same direction as the light energy from the main pump of said other amplifier. A common input of each amplifier receives both the main pump signal and the recovered pump energy.

Thus, in the known circuit, each amplifier is provided with a component analogous to an adder having one input for the pump and another input for the recovered energy, and having an output connected to the pump input of the amplifier.

OBJECTS AND SUMMARY OF THE INVENTION

The invention seeks to simplify the above described circuit and, in particular, to reduce component count, thereby increasing reliability.

For repeaters in an undersea link, reliability is an essential quality since such equipment is practically inaccessible and the simpler its structure and the smaller the number of its components, the greater its reliability.

In the present invention the pump energy recovered at the output of one amplifier is reinjected into the other amplifier in the direction opposite to the direction in which the main pump energy is injected into said other amplifier.

In the preferred embodiment, each amplifier has a recovery terminal performing two functions: firstly it acts as an output for the recovered pump energy and secondly it acts as an input for injecting the pump energy recovered from the other amplifier.

Under such conditions, a single link is provided between the recovery terminals of the two amplifiers, thereby providing a circuit that is particularly simple. Preferably, in said link, a bidirectional bandpass filter is provided having its characteristic centered on the pump wavelength.

Whatever the embodiment, the invention has the advantage of optimizing power and of minimizing the noise added to the signal by the pumping. Power optimization is due to energy recovery; noise is minimized as a consequence of the both-way pumping, i.e. pumping that is both "codirectional" and "contradirectional" within the amplifiers. The term "codirectional" pumping covers injecting pump energy in the same direction as the amplified optical signal while the term "contradirectional" pumping covers injecting pump energy in the direction opposite to the propagation direction of the amplified signal.

BRIEF DESCRIPTION OF THE DRAWINGS

Other characteristics and advantages of the invention appear from the following description of various embodiments, which description is given with reference to the accompanying drawings, in which.

MORE DETAILED DESCRIPTION OF THE INVENTION

Figure 1:
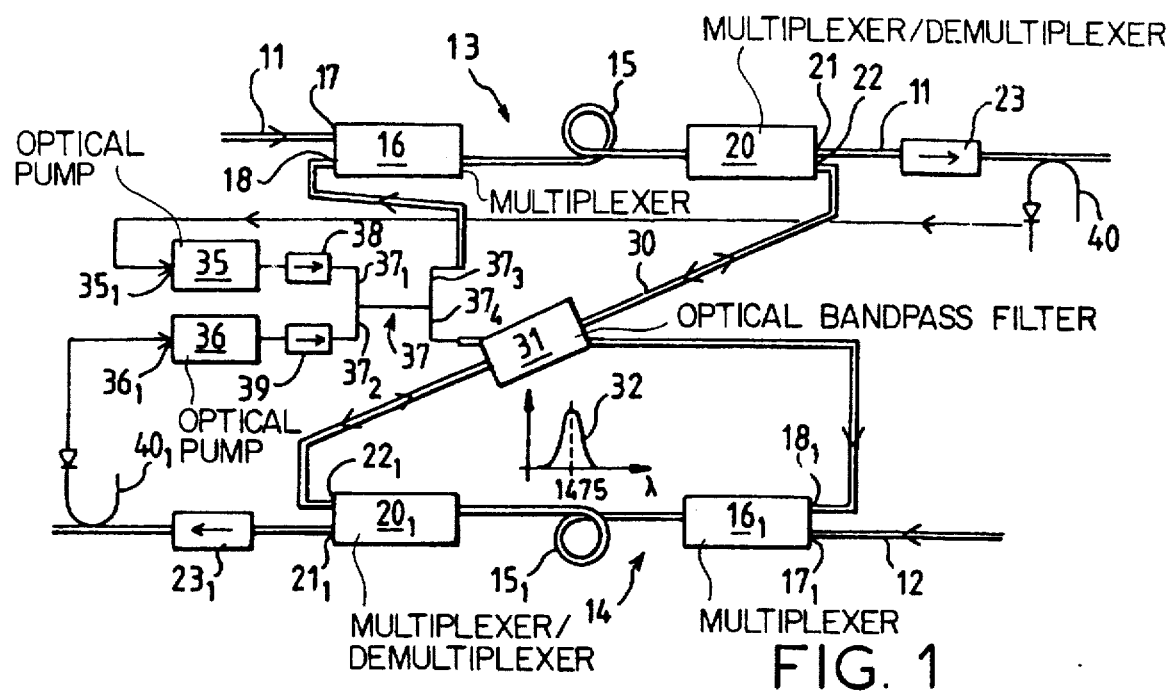
FIG. 1 is a circuit diagram of a repeater of the invention.

The example described below with reference to the figures is a repeater for an undersea installation for transmitting telephone signals or digital data.

Transmission takes place in both directions. As a result, an optical conductor 11 is provided in the "go" direction and an optical conductor 12 is provided in the "return" direction.

For each direction, the repeater includes an optical amplifier. Thus, amplifier 13 is provided to amplify the signal in the go direction and amplifier 14 is provided to amplify the signal in the return direction.

The two optical amplifiers 13 and 14 are of identical structure. Only one of them is described below, i.e. the amplifier referenced 13 for the go direction.

The active medium of the amplifier 13 is constituted by an erbium-doped silica optical fiber 15. The optical conductor 11 and the fiber 15 transmit wavelengths lying in the range about 1530 nm to 1580 nm. The optical amplifier 13 has a gain maximum at a wavelength of 1558 nm.

Upstream from the fiber 15, the amplifier 13 includes a multiplexer 16 having an input 17 for the optical signal that is to be transmitted and an input 18 for receiving pump energy coming from one or more lasers operating at a wavelength equal to 1475 nm.

At the downstream end of the fiber 15, the amplifier 13 includes a multiplexer/demultiplexer 20 having two outputs, in particular: an output 21 for the amplified optical signal at a wavelength that is equal to or close to 1558 nm; and an output 22 for the pump wavelength, i.e. 1475 nm.

Downstream from the output 21, on the conductor 11, there is also provided an isolator 23.

The components of the optical amplifier 14 in the return direction and corresponding to components of the amplifier 13 are given the same reference numerals, with the subscript 1.

Each of the terminals 22 and $22_1$ performs two functions: firstly, it constitutes an output for the signal at the wavelength 1475 nm, and secondly, as explained below, it also constitutes an input for an optical signal at the same wavelength, and recovered from the other optical amplifier.

According to an important aspect of the invention, the terminals 22 and $22_1$ are connected together by means of an optical connection 30 that includes an optical bandpass filter 31 centered on the pump wavelength 1475 nm. The waveform diagram adjacent to the bidirectional filter 31 shows the transmission curve 32 of said filter as a function of wavelength. The width of the passband of said filter 31 is about 20 nm. By way of example, the filter may be constituted by an interference plate.

The optical pumping is performed by means of two pumps 35 and 36 which are lasers each emitting at the wavelength 1475 nm.

The output from the pump 35 is connected to the first input $37_1$ of a coupler 37 via an isolator 38.

Similarly, the output of the pump 36 is connected to the second input $37_2$ of the coupler 37 via another isolator 39.

The coupler 37 has two outputs $37_3$ and $37_4$. The output $37_3$ is connected to the input 18 of the multiplexer 16 of the amplifier 13. The output $37_4$ of the coupler 37 is connected to the input $18_1$ of the multiplexer $16_1$ of the optical amplifier 14.

The coupler 37 is of the 40/60 type, i.e. there appears on the output $37_3$ a signal whose power is 60% of the power of the pump 35 and 40% of the power of the pump 36. Similarly, a pump signal appears on the output $37_4$ of power equal to the sum of 40% of the power $P_1$ of the pump 35 and 60% of the power $P_2$ of the pump 36.

The pump 35 has a regulation input $35_1$ receiving an optical signal corresponding to the output power from the amplifier 13. To this end, a sampling coupler 40 is provided downstream from the isolator 23 and serves to transmit about 4% of the output energy from the isolator 23 to the input $35_1$.

Similarly, the pump 36 has a regulation input $36_1$ receiving an optical signal representing the signal at the output of the amplifier 14. For this purpose, another coupler $40_1$ is located downstream from the isolator $23_1$.

The signals on the inputs $35_1$ and $36_1$ of the pumps 35 and 36 respectively, serve to maintain the output signal constant on each of the amplifiers. This type of regulation is conventional, and it does not need to be described in greater detail herein.

In this example, the multiplexers/demultiplexers 20 and $20_1$ comprise respective interference plates 45. In conventional manner, such a plate is constituted by a glass plate on which one or more layers are deposited for the purpose of isolating selected wavelengths.

Figure 2:
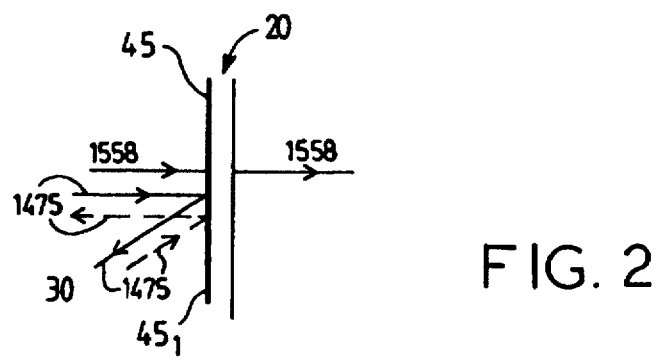
FIG. 2 is a diagram explaining the operation of a multiplexer forming a portion of the FIG. 1 repeater.

In FIG. 2, the transmitted optical signal is represented by an arrow beside which the wavelength 1558 nm is marked. Similarly, the pump signal (recovered or incoming) is represented by an arrow beside which the wavelength 1475 nm is marked.

In FIG. 2, it can be seen that the plate 45 transmits the working signal 1558 from left to right. The pump signal that is not dissipated in the fiber 15 (FIG. 1) reaches the left face $45_1$ of the plate 45 where it is returned towards the conductor 30. Similarly, the pump signal recovered at the output $22_1$ of the demultiplexer $20_1$ is brought by the optical conductor 30 to the face $45_1$ so as to return, from right to left, towards the fiber 15.

Overall, so far as pumping concerned, the repeater operates as follows:

About 80% of the energy of the laser beam applied to the input 18 is used for exciting electrons in the fiber 15, with the remaining 20% being transmitted by said fiber so as to be recovered on the output 22. The output 22 applies a pump signal to the input $22_1$ of the multiplexer $20_1$, which pump signal is used in contradirectional manner in the amplifier 14.

Similarly, the pump signal recovered on the terminal $22_1$ in the amplifier 14 (i.e. the pump signal that is not used in said amplifier 14) is applied to the terminal 22 of the amplifier 13 to perform contradirectional pumping in said amplifier.

Thus, each optical amplifier receives codirectional pump energy via its input 18 or $18_1$ and contradirectional pump input via its input 22 or $22_1$. This provision of pump energy in both directions is favorable to reducing the noise generated by the pumping in the working signal that conveys information. Noise is reduced with more uniform distribution of pump energy along a doped fiber, and combining contradirectional pumping with codirectional pumping improves pump energy distribution.

The increase in pump power which is obtained by recovering energy by means of the repeater circuit including the link 30 gives rise, in each amplifier, to a gain curve as a function of wavelength that presents a marked plateau 51 (FIG. 3) over a wavelength range of about 20 nm. This plateau 51 is advantageous for an installation in which a plurality of wavelengths are transmitted by the optical conductors.

Figure 3:
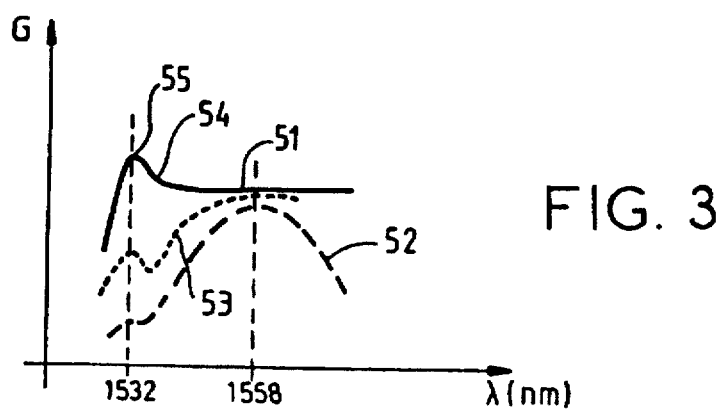
FIG. 3 is a graph showing the gain curve of an amplifier in the repeater of FIG. 1.

FIG. 3 is a graph with wavelength λ expressed in nanometers plotted along the abscissa and gain G plotted up the ordinate. Curve 52 corresponds to a total pump power of about 30 mW. Curve 53 corresponds to a total pump power of about 60 mW, and curve 54 having the plateau 51 corresponds to a total pump power of 80 mW.

With relatively large pump power, a gain peak 55 is obtained at the wavelength 1532 nm. This peak is smoothed off by a filter (not shown).

The circuit described above with reference to the figures is very simple, thus favoring reliability thereof, where reliability is an essential feature for undersea repeaters.

The pumps 35 and 36 emit non-polarized signals.

In a variant, instead of using an interference plate coupler or demultiplexer, a melt-stretch type coupler is provided.

In the embodiments described, the optical amplifiers 13 and 14 transmit signals in opposite directions. The invention is not restricted to that configuration. In a variant, the signals could be transmitted in the same direction.

Similarly, the invention is not limited to the fact that the main pumping is codirectional and the reinjected pumping is contradirectional. It is equally possible to provide for the opposite situation, i.e. main pumping being contradirectional and reinjected pumping being codirectional.

In general, the invention applies to a circuit having two optical amplifiers each of which has a pump source, an active medium such as a fiber, and means for recovering the pump energy that is not used in the active medium so as to enable it to be reinjected into the other amplifier, wherein the recovery means is such that reinjection takes place in the direction opposite to the direction in which the main energy is injected into the pump.

We claim:

1. A circuit having two optical amplifiers each amplifying a respective optical signal, each amplifier comprising:

an active medium for carrying the optical signal;

a pump source for injecting main pump energy into the active medium; and means for recovering unused pump energy in the active medium;

wherein said means for recovering reinjects said unused pump energy into the other amplifier in a direction opposite to the direction in which the main pump energy is injected into said other amplifier.

2. A circuit according to claim 1, wherein, in each optical amplifier, the main pump energy travels in the same direction as the optical signal to be amplified.

3. A circuit according to claim 1, wherein each optical amplifier transmits its respective optical signal in a direction opposite to the respective optical signal of the other optical amplifier.

4. A circuit according to claim 1, wherein each optical amplifier includes a recovery terminal constituting both an output for the unused pump energy and an input for reinjecting the unused pump energy recovered from the other optical amplifier.

5. A circuit according to claim 4, including a conductor constituting an optical link between the recovery terminals of the two amplifiers.

6. A circuit according to claim 5, including a bandpass filter centered on the pump wavelength, and located in the optical link between the recovery terminals of the two amplifiers.

7. A circuit according to claim 1, wherein the means for recovering includes an interference plate for separating the pump wavelength from the wavelength of the signal to be amplified.

8. A circuit according to claim 1, wherein the active medium of each amplifier comprises an erbium-doped fiber.

9. A circuit according to claim 1, wherein each pump source is regulated such that each amplifier delivers constant power.

10. A circuit according to claim 1, including two pump sources connected to a coupler having two outputs, each output being connected to a respective amplifier, each of said outputs delivering pump energy which is a function of the main pump energy supplied by the two sources.

11. A circuit according to claim 1, wherein said circuit is capable for use in a repeater for long distance transmission of optical signals.

12. A circuit according to claim 11, wherein said long distance transmission is undersea transmission.

* * * * *